United States Patent [19]

Cipolli et al.

[11] Patent Number: 5,200,445

[45] Date of Patent: Apr. 6, 1993

[54] SELF-EXTINGUISHING ELASTOMERIC POLYMERIC COMPOSITIONS COMPRISING TRIAMINO TRIAZINE OLIGOMERS AND PHOSPHATES AND/OR PHOSPHONATES

[75] Inventors: Roberto Cipolli, Novara; Enrico Masarati, Piacenza; Gilberto Nucida, Milan; Mario Pirozzi, Milan; Roberto Oriani, Milan, all of Italy

[73] Assignee: Ministero Dell'Universita' e Della Ricerca Scientifica e Tecnologica, Rome, Italy

[21] Appl. No.: 757,591

[22] Filed: Sep. 11, 1991

[30] Foreign Application Priority Data

Sep. 13, 1990 [IT] Italy .................. 21456 A/90

[51] Int. Cl.⁵ .......................... C08J 5/10; C08K 5/34; C08L 23/00
[52] U.S. Cl. ..................... 524/100; 524/91; 524/96; 524/101; 524/415; 524/416
[58] Field of Search ............ 524/91, 96, 100, 101, 524/415, 416

[56] References Cited

U.S. PATENT DOCUMENTS 4,504,610  3/1985  Fontanelli et al. ............ 524/96
4,997,876  3/1991  Scarso ........................ 524/706

FOREIGN PATENT DOCUMENTS 0326082  8/1989  European Pat. Off. .

Primary Examiner—Paul R. Michl
Assistant Examiner—U. K. Rajguru
Attorney, Agent, or Firm—Oblon, Spivak, McClelland, Maier & Neustadt

[57] ABSTRACT

Polymeric compositions endowed with high characteristics of flame self-estinguishing, based on thermoplastic polymers or showing elastomeric properties, especially olefin polymers and copolymers, comprising:

a) from 89 to 40 parts by weight of a thermoplastic polymer or having elastomeric properties;
b) from 8 to 33 parts b.w; of one or more phosphates and/or phosphonates of ammonium or of an amine;
c) from 3 to 27 parts b.w. of one or more oligomeric compounds derived from the 2,4,6-triamino-1,3,5-triazine, having the general formula (I)

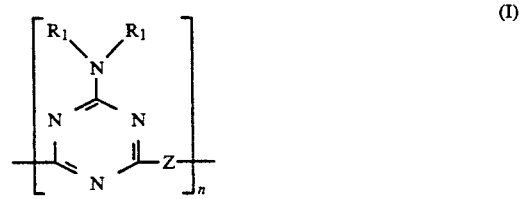

45 Claims, No Drawings

SELF-EXTINGUISHING ELASTOMERIC POLYMERIC COMPOSITIONS COMPRISING TRIAMINO TRIAZINE OLIGOMERS AND PHOSPHATES AND/OR PHOSPHONATES

The present invention relates to self-extinguishing compositions based on thermoplatic polymers or polymers having elastomeric properties, expecially olefinic polymers and copolymers, containing triazinic compounds in combination with phosphates and/or phosphonates of ammonium or of an amine.

Different solutions are known in the art to reduce or remove the combustibility of polymers. Some of these solutions are based on the use of metal compounds, expecially antimony, bismuth or arsenic, in combination with organic compounds partially halogenated and thermally unstable, such as chlorinated paraffinic waxes.

Other solutions are based on the use of substances able to produce intumescence. Formulations of the intumescent type generally consist of the polymer and of at least three main additives: one essentially phosphorated, the purpose of which is to form in the combustion an impermeable, semisolid, vitreous layer, consisting essentially of polyphosphoric acid and to activate the intumescence formation process; a second containing nitrogen which acts as foaming agent and a third containing carbon which acts as carbon donor for forming an insulating cellular carbon layer (char) between the polymer and the flame.

Examples of intumescent formulations belonging to this type are those described by U.S. Pat. No. 3,810,862 (Phillips Petroleum Co.) based on melamine, pentaerythritol and ammonium polyphosphate; U.S. Pat. No. 4,727,102 (Vamp s.r.l.) based on melamine cyanurate, a hydroxyalkyl derivative of the isocyanuric acid and ammonium polyphosphate, and by Published Patent Application WO 85/05626 (Plascoat U.K. Ltd) based on different phosphorus and nitrogen compounds among which, in particular, a combination of melamine phosphate, pentaeythritol and ammonium polyphosphate.

In more recent formulations, together with the use of an organic or inorganic compound of phosphorus, an organic compound containing nitrogen has been used, generally an aminoplastic resin obtained by condensing urea, melamine or dicyandiamide with formaldehyde.

Examples of formulations with two additives are those described in U.S. Pat. No. 4,504,610 (Montedison S.p.A.) based on oligomeric derivatives of 1,3,5-triazine and ammonium polyphosphate and European Patent 14.463 (Montedison S.p.A.) based on organic compounds selected from benzylguanamine and reaction products between aldehydes and many cyclic nitrogenous compounds, in particular benzylguanamine-formaldehyde copolymers, and ammonium polyphosphate.

It is also possible to obtain self-extinguishing composition using monocomponent additives, containing in the organic molecule both nitrogen and phosphorus as described in U.S. Pat. No. 4,201,705 (Borg-Warner Corp.).

These intumescent retarting systems give to the polymer containing them the property to form a carbon residue following a fire or application of a flame. Retarding systems of this type show many advantages: absence of corrosion phenomena in apparatus in which polymers are processed, lower smoke emission in comparison with systems containing metal compounds and halogenated hydrocarbons, and overall the possibility to give to polymers satisfactory antiflame properties using a lower ambunt of total additive and therefore without an excessive decay of the mechanical properties of polymers themselves.

The Applicant have now found that polymeric compositions are obtained having very good anti-flame properties using a category of oligomeric compounds derived from 2,4,6-triamino-1,3,5-triazine the effectiveness of which is higher also than that of products known in the art.

More particularly, the compositions of the present invention comprise:

a) from 89 to 40 parts by weight of a thermoplastic polymer or of a polymer having elastomeric properties;

b) from 8 to 33, preferably from 12 to 30, parts by weight of one or more phosphates and/or phosphonates of ammonium or of an amine;

c) from 3 to 27, preferably from 4 to 20, parts by weight of one or more oligomeric compounds derived from 2,4,6-triamino-1,3,5-triazine, having the general formula (I):

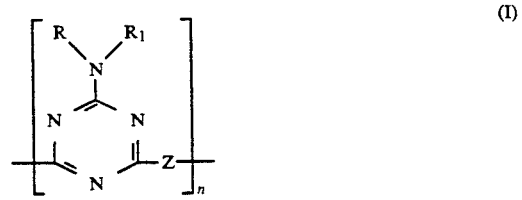

wherein:

R is $-C_mH_{2m}-O-R_2$ wherein m is an integer comprised between 2 and 8, preferably between 2 and 4;

$R_2$ is H; $C_1-C_8$-alkyl, preferably H or $C_1-C_4$-alkyl; $C_2-C_8$-alkenyl; $-C_pH_{2p}-O-R_3$ wherein p is an integer comprised between 1 and 4 and $R_3$ is H or $C_1-C_4$-alkyl; $C_6-C_{12}$-cycloalkyl or $C_6-C_{12}$-alkylcycloalkyl;

$R_1$ is H; alkyl $C_1-C_4$ or R; or the group:

is substituted by a group $-NH_2$:

n is an integer comprised between 2 and 50;

Z is a divalent or polyvalent radical comprised in one of the following formulae:

wherein radicals $R_4$, equal or different among them, are hydrogen or $(C_1-C_4)$-alkyl;

-continued

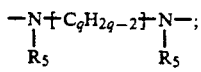   (IV)

wherein q is an integer comprised between 2 and 14; $R_5$ is hydrogen; $(C_1-C_4)$-alkyl $(C_2-C_6)$-alkenyl; $(C_1-C_4)$-hydroxyalkyl;

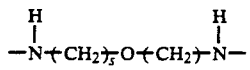   (V)

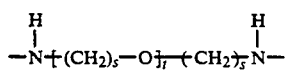   (VI)

wherein s is an integer comprised between 2 and 5 and t is an integer comprised between 1 and 3;

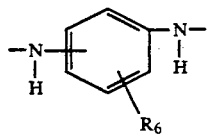   (VII)

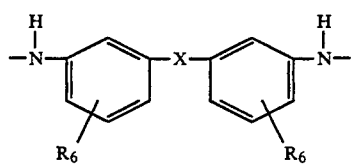   (VIII)

wherein:
X is a direct linkage C—C; O; S; S—S; $SO_2$; NH; $NHSO_2$; NHCO; N=N; $CH_2$;
$R_6$ is hydrogen; hydroxyl; $(C_1-C_4)$-alkyl; $(C_1-C_4)$-alkoxy;

   (IX)

wherein A may be a saturated or an unsaturated cycle;

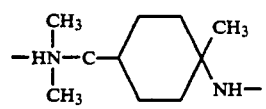   (X)

   (XI)

wherein s has the previously defined meaning;

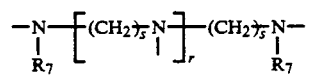   (XII)

wherein $R_7$ is hydrogen or $(C_1-C_4)$-alkyl; r is an integer comprised between 1 and 5; indexes s, equal or different among them, have the previously defined meaning;

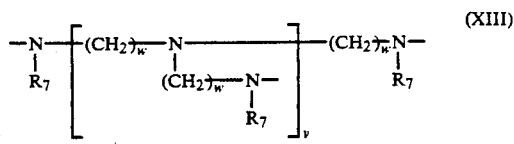   (XIII)

wherein:
$R_7$ has the previously defined meaning;
w is an integer comprised between 2 and 4;
v is 1 or 2.

As previously said, there are known in the art examples of formulations with two additives based on oligomeric derivatives of the 2,4,6-triamino-1,3,5-triazine and ammonium polyphosphate (U.S. Pat. No. 4,504,610 of Montedison S.p.A.) in comparison with which the compositions based on oligomeric compounds of formula (I), object of the present invention, show better antiflame properties, in particular when comprising polymers such as polyethylene or copolymers derived from ethylene.

In fact if the polymeric compositions of the present invention generally show good antiflame properties on thermoplastic polymers or on polymers having elastomeric properties when radicals R and $R_1$ in the general formula (I) are equal to hydrogen, it has been surprisingly found that the same compositions show very good antiflame properties when at least one of the above mentioned radicals is a hydroxyalkyl or alkoxyalkyl radical as previously defined, and the polymer is preferably polyethylene or a copolymer of ethylene.

Advantages obtained by the introduction of the hydroxyalkyl or alkoxyalkyl substituent have to be considered surprising in that analogous oligomeric derivatives wherein radicals R and/or $R_1$ are equal to alkyl reduce the self-extinguishing characteristics of the polymeric compositions containing them.

The above mentioned compounds of general formula (I) are particularly stable to heat and maintain therefore a high activity as flame retarders also owing to working heat processings of polymeric compositions containing them.

Furthermore, the compositions of the present invention show the advantage of giving yield, if a fire occurs, to a very moderate and not darkening emission of smokes.

Examples of radical R, in the general formula (I), are: 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(2-hydroxyethoxy)ethyl; 2-(2-methoxyethoxy)ethyl; etc.

Examples of radical $R_1$ are, besides those defined for R: methyl; ethyl; propyl; isopropyl; butyl; isobutyl; ter-butyl.

Examples of radicals -Z- are those deriving from the following compounds, by removing a hydrogen from each reacted amino group: piperazine; 2-methylpiperazine; 2,5-dimethylpiperazine; 2,3,5,6-tetramethylpiperazine; 2-ethylpiperazine; 2,5-diethylpiperazine; 1,2-diaminoethane; 1,3-diaminopropane; 1,4-diaminobutane; 1,5-diaminopentane; 1,6 diaminohexane; 1,8-diaminooctane; 1,10-diaminodecane; 1,12-diaminododecane; N,N'-dimethyl-1,2-diaminoethane; N-methyl-1,3-diaminopropane; N-ethyl-1,2-diamino-ethane; N-isopropyl-1,2-diaminoethane; N-(2-hydroxyethyl)-1,2-diaminoethane; N,N'-bis(2-hydroxyethyl)-1,2-diaminoethane; N-(2-hydroxyethyl)-1,3-diaminopropane; N-hexenyl-1,6-diaminohexane; N,N'-diethyl-1,4-diamino-2-butene; 2,5-diamino-3-hexene; 2-aminoethylether; (2-aminoethoxy)methylether; 1,2-bis(2-aminoethoxy)ethane; 1,3-diaminobenzene; 1,4-diaminobenzene; 2,4-diaminotoluene; 2,4-diaminoanisole; 2,4-diaminophenol; 4-aminophenylether; 4,4'-methylendianiline; 4,4'-diaminobenzanilide; 3-aminophenylsulfone; 4-aminophenyesulfone; 4-aminophenylsufoxide; 4-aminophenyldisulfide; 1,3-bis(aminoethyl)benzene; 1,4-bis(aminoethyl)benzene; 1,3-bis(aminomethyl)cyclohexane; 1,8-diamino-p-menthane; 1,4-bis(2-aminoethyl)piperazine; 1,4-bis(3-aminopropyl)piperazine; 1,4-bis(4-aminobutyl)piperazine; 1,4-bis(5-aminopentyl)piperazine; bis(2-aminoethyl)amine; bis(3-aminopropyl)amine; bis(4-aminobutyl)amine; bis(5-aminopentyl)amine; bis[2-(N-methylamino)ethyl]amine; 2-N-butyl-bis(2-aminoethyl)amine; bis[3-(N-methylamino)propyl]amine; N-(3-aminopropyl)-1,4-diaminobutane; N-(3-aminopropyl)-1,5-diaminopentane; N-(4-aminobutyl)-1,5-diaminopentane; tris(2-aminoethyl)amine; tris(3-aminopropyl)amine; tris(4-aminobutyl)amine; tris[2-(N-ethylamino)ethyl]amine; N,N'-bis(2-aminoethyl)-1,2-diaminoethane; N,N'-bis(3-aminopropyl)-1,3-diaminopropane; N,N'-bis(2-aminoethyl)-1,3-diaminopropane, N,N'-bis(3-aminopropyl)-1,2-diaminoethane; N,N'-bis(3-aminopropyl)1,4-diaminobutane; bis[2-(2-aminoethyl)aminoethyl]amine; N,N'-bis[2-(2-aminoethyl)aminoethyl]-1,2-diaminoethane; N,N'-bis[3-(2-aminoethyl)aminopropyl]-1,2-diaminoethane; N,N,N',N'-tetrakis(2-aminoethyl)-1,2-diaminoethane; etc.

Particularly preferred are compounds of general formula (I) wherein $R_1$ is hydrogen.

Oligomeric compounds comprised in the general formula (I) not specified in examples, but equally advantageously useable in the self-extinguishing polymeric compositions of the present invention are those listed in Table 1.

TABLE 1

| COMPOUNDS | R—N—$R_1$ | | —Z— | $\eta$ |
|---|---|---|---|---|
| 1 | $CH_2CH_2OH$ | H | —$HNCH_2CH_2OCH_2CH_2NH$— | 15 |
| 2 | $CH_2CH_2OC_2H_5$ | H | 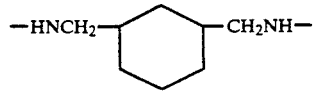 | 13 |
| 3 | $(CH_2)_5OH$ | H |  | 18 |
| 4 | $CH_2CH_2CH_2OCH_3$ | H | 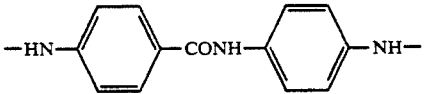 | 16 |
| 5 | $CH_2CH_2OH$ | $CH_2CH_2OH$ | $N(CH_2CH_2NH—)_3$ | 12 |
| 6 | $(CH_2)_3OH$ | H | —$HN(CH_2)_3$—$\underset{H}{N}$—$(CH_2)_3NH$— | 16 |
| 7 | $\underset{CH_3}{CH_2CHOH}$ | H |  | 21 |
| 8 | H | H | —$HNCH_2CH_2NH$— | 17 |
| 9 | $CH_2CH_2OCH=CH_2$ | H | 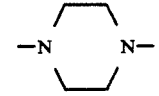 | 20 |
| 10 | $CH_2CH_2OCH_3$ | $CH_2CH_2OCH_3$ | —$\underset{CH_2CH_2OH}{N}$—$CH_2CH_2$—$NH$— | 18 |
| 11 | $CH_2CH_2OCH_3$ | H | —$\underset{CH_3}{N}$—$CH_2CH_2$—$\underset{CH_3}{N}$— | 18 |

TABLE 1-continued

| COMPOUNDS | R—N—R₁ | | —Z— | η |
|---|---|---|---|---|
| 12 | CH₂CH₂OCH₂CH₂OCH₃ | H | —N⟨   ⟩N— (piperazine) | 14 |
| 13 | CH₂CH₂O— | H | —N⟨   ⟩N— (piperazine) | 15 |
| 14 | (CH₂)₃OC₂H₅ | H | 2,5-dimethylpiperazine (—N⟨CH₃⟩⟨CH₃⟩N—) | 20 |
| 15 | CH₂CH₂OCH₃ | H | —N(C₂H₅)—CH₂—CH=CH—CH₂—N(C₂H₅)— | 17 |
| 16 | CH₂CH₂OCH₃ | H | —N(CH₂CH₂OH)—CH₂CH₂—N(CH₂CH₂OH)— | 16 |
| 17 | CH₂CH₂OH | CH₃ | —HN—CH₂CH₂N(|)—CH₂CH₂NH— | 20 |
| 18 | (CH₂)₄OCH₃ | H | —HNCH₂CH₂CH₂NH— | 18 |
| 19 | CH₂CH₂OCH₃ | H | —HN(CH₂)₂N(CH₂)₂N(CH₂)₂NH— | 11 |

Compounds of general formula (I) can be prepared by allowing to react a cyanuric acid halide, for instance the chloride, at a temperature comprised between 0° and 10° C. and with a pH comprised between 5 and 7, in a suitable solvent (such as for instance acetone, water, methylene chloride, etc.) with an amine of general formula (XIV):

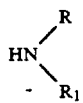
(XIV)

wherein R and R₁ have the previously defined meaning, either in the presence or not (according to the used molar ratio) of an acid acceptor (such as for instance NaOH, NaCHO₃, Na₂CO₃ triethylamine, etc.) thus obtaining the intermediate (XV):

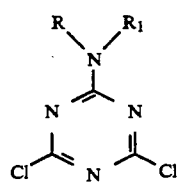
(XV)

This derivative, either separated or not, is subsequently allowed to react under conditions analogous to the preceding ones but working at temperature comprised between 70° and 150° C. and thereafter with solvent compatible with those temperatures (such as for instance water, toluene, xylene, acetonitrile, etc.) with a polyamine of general formula (XVI):

H—Z—H     (XVI)

wherein Z is a radical comrised in one of the general formulae from (II) to (XIII), in the presence of an acid acceptor.

The molar ratio between the intermediate (XV) and the polyamine (XVI) varies from 1:1, to obtain linear oligomers, to a maximum of 3.5:1 to obtain branched oligomers.

An alternative method consists in allowing a cyanuric acid halide, for instance the chloride, to react with a polyamine of the general formula (XVI) as above defined, in the suitable molar ratio, always under conditions analogous to those previously described, but working at temperature comprised between 0° and 60° C., to give the intermediate of general formula (XVII):

(XVII)

wherein: Z and n have the previously defined meaning.

This intermediate, either separated or not, is again allowed to react with an amine of general formula (XIV) at a temperature comprised between 80° and 150° C. under conditions analogous to the preceding ones.

Among phosphates, ammonium polyphosphates are preferred which are comprised in the general formula $(NH_4)_{n+2}P_nO_{3n+1}$ wherein n represents an integer equal to or higher than 2; preferably the molecular weight of polyphosphates must be enough high to secure a low water solubility. As example n varies preferably between 2 and 500.

The composition of polyphosphates having the above indicated formula, wherein n is a number enough large and preferably comprised between 5 and 500, is practically that corresponding to the formula of methaphosphates $(NH_4PO_3)_n$.

An example of these polyphosphates is that known by the trade name "Exolit 422" (manufactured and sold by Hoechst Society) and having the composition $(NH_4PO_3)_n$ wherein n is higher than 50; another example is the product known by the trademark "Phos-Chek P/30" (Monsanto Chemical) and having analogous composition.

Another polyphosphate adavantageously useable, in particular because of its reduced water solubility, is that known by the trade name "Exolit 462" (manufactured and sold by Hoechst) and corresponding to Exolit 422 microencapsulated in melamine-formaldehyde resin.

Other phosphates useable are those derived from amines, such as for instance dimethylammonium or diethylammonium phosphate, ethylendiamine phosphate, melamine ortho- or pyrophosphate.

Among phosphonates very good results have been obtained using ammonium phosphonates (mono or polysubstituted) derived from mono and polyphosphonic acids, examples of which are: ethane-1,1,2-triphosphonic acid; 2-hydroxyethane-1,1,2-triphosphonic acid; propane-1,2,3-triphosphonic acid; methylphosphonic acid; ethylphosphonic acid; n-propylphosphonic acid; n-butylphosphonic acid; phenylphosphonic acid; 1-aminoethane-1,1-diphosphonic acid; 1-hydroxyethane-1,1-diphosphonic acid; 1-hydroxydodecane-1,1-diphosphonic acid; phosphonacetic acid; 2-phosphonopropionic acid; 3-phosphonopropionic acid; 2-phosphonobutyric acid; 4-phosphonobutyric acid; aminotris(methylenphosphonic) acid; ethylendiaminotetra(methylenphosphonic) acid; hexamethylendiaminotetra(methylenphosphonic) acid; diethylentriaminopenta(methylenphosphonic) acid; etc.

Among polymers useable in compositions of the present invention olefinic polymers and copolymers of general formula $R—CH=CH_2$ wherein R is a hydrogen atom or a $(C_1-C_8)$-alkyl or aryl radical are preferred; in particular:
1. HDPE, LLDPE, LDPE polyethylene;
2. isotactic or prevailingly isotactic polypropylene;
3. propylene crystalline copolymers with lower proportions of ethylene and/or other alpha-olefins, such as for instance betene-1, octene-1, 4-methyl-pentene-1
4. heterophasic compositions comprising: (A) a homopolymeric fraction of ethylene or propylene, or one of copolymers under (3) and (B) a copolymeric fraction consisting of elastomeric copolymers of ethylene with an alpha-olefin, containing optionally lower proportions of a diene, wherein the alpha-olefin is preferably selected from propylene and butene-1.
5. elastomeric copolymers of ethylene with alpha-olefins containing optionally lower proportions of a diene. Examples of diene among those more commonly present in the above mentioned elastomeric copolymers are butadiene, ethylidene-norbornene, hexadiene-1,4. Among the polymers of olefins of formula $R—CH=CH_2$ wherein R is an aryl radical the preferred is the "crystal" and antishock polystyrene. Other examples of commonly useable polymers are copolymers acrylonitrile/butadiene/styrene (ABS) and styrene/acrylonitrile (SAN); the polyurethane (polyester and polyether), the polyethylenterephthalate; the polybutylenterephthalate; polyamides; etc.

Self-extinguishing compositions of the present invention can be prepared according to known methods: for instance the phosphate and/or phosphonate of ammonium or of amine is first intimately mixed with one or more nitrogenous compounds of general formula (i) finely milled (preferably with particles lower than 70 microns) and the thus obtained mixture is added to the polymer in a turbomixer to form a homogeneous blend which is extruded and granulated. The granular product thus obtained can be transformed into different articles according to any of the known molding techniques.

Antiflame additives of the present invention can be used also in the field of the antifire paints.

Examples reported hereinafter illustrate the distintive features of the invention without limiting them.

EXAMPLE 1

184.5 g of cyanuric acid chloride and 700 cc of water are introduced in a 2 liters reactor equipped with stirrer, thermometer, feeding funnel, condenser and cooling bath.

While cooling from the outside, 75 g of 2-methoxyethylamine and 40 g of sodium hydroxide dissolved in 100 cc of water are fed contemporarily, within 3 hours, keeping the pH comprised between 5 and 7 and the temperature comprised between 0° and 3° C.

The whole is kept at the temperature of 0°-3° C. for further 2 hours and then the product formed is filtered and washed on the filter with water.

By drying the cake in oven at 50° C. under vacuum, 197.4 g of the intermediate (XVIII):

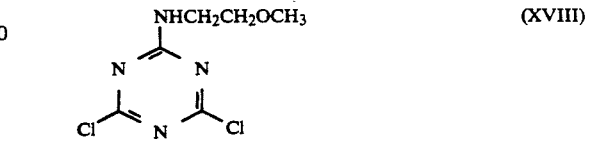

are obtained in form of white crystalline powder; melting point (m.p.)=73°-75° C. and chlorine content 31.68% (theor.: 31.84%).

The structure of the intermediate has been confirmed by NMR analysis.

800 cc of xylene, 50 cc of water and 100 g of the intermediate (XVIII) are introduced in the same 2 liters apparatus, but provided with heating bath, and thereafter 26.9 g of ethylendiamine are introduced while agitating and within 20 minutes.

The temperature of the dispersion raises up to 60°-65° C.; by means of the outer bath it is raised to 75° C. and is agitated for about 1 hour.

Thereafter, 17.5 g of sodium hydroxide dissolved in 40 cc of water, are added within 2 hours and at the temperature of 75° C.

The temperature is raised to 95° C. and the whole is maintained at this value for 2 hours while agitating.

Subsequently, within about 2 hours, 18.4 g of sodium hydroxide dissolved in 40 cc of water are added.

The temperature is gradually raised by removing azeotropically the water, until the boiling temperature of the solvent is reached.

After having kept under reflux for 10 hours, the mass is cooled to room temperature and the product obtained is filtered.

The cake is well rinsed and then is abundantly washed with water.

After drying in oven at 100° C., 84.9 g of the product:

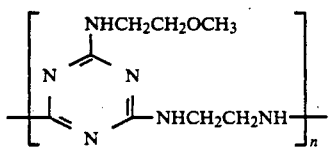

are obtained in form of white crystalline powder; m.p.=182°-186° C. and n=20.

EXAMPLE 2

800 cc of water and 184.5 g of cyanuric acid chloride are introduced in the same 2 liters reactor of example 1.

Following the same procedure described in example 1, 133 g of bis(2-methoxyethylamine) are introduced.

By working again according to the modalities described in that example, 250.8 g of the intermediate (XIX):

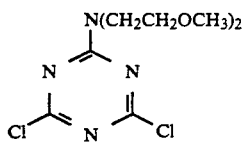

are obtained in form of white crystalline powder; m.p.=62°-65° C. and chlorine content 25.08% (theor.: 25.27%).

The structure of the intermediate (XIX) has been further confired by the NMR analysis.

In the same 2 liters reactor of example 1 there are introduced 800 cc of xylene, 50 cc of water, 135 g of intermediate (XIX) and finally 41.3 g of piperazine, within 15 minutes and under agitation.

The temperature of the suspension raises to 40°-45° C.

By working according to the modalities described in example 1 (in this case 38 g are used of sodium hydroxide) 136.4 g of the product:

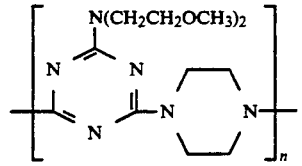

are obtained in form of white crystalline powder having m.p. higher than 300° C. and n=18.

EXAMPLE 3

400 cc of acetone and 100 g of cyanuric acid chloride are introduced in the same 2 liters reactor of example 1.

The suspension is cooled to 0°-5° C. and within 1 hour 23.4 g of piperazine are added. Always at 0°-5° C. and within 2 hours contemporarily in such a way to maintain the pH at about 3, 23.3 g of piperazine and 10.8 g of sodium hydroxide dissolved in 50 cc of water are fed.

The temperature is raised to 20° C. and contemporarily within about 2 hours, 10.8 g of sodium hydroxide dissolved in 50 cc of water are fed in such a way to keep the pH at about 5.

The temperature is gradually raised from 20° to 60° C. feeding, within about 2 hours, a solution consisting of 21.8 g of sodium hydroxide in 100 cc of water.

The whole is kept under agitation for further 2 hours and then is cooled to room temperature and the product formed is filtered and washed on the filter with water.

By drying the cake in over at 100° C. 104.9 g of the intermediate (XX):

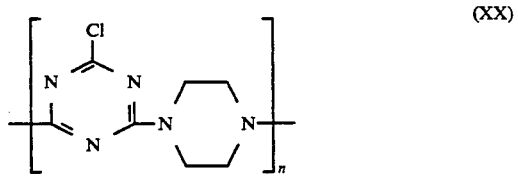

are obtained in form of white crystalline powder; m.p. higher than 300° C. and n=15; chlorine content 17.7% (theor.: 17.94%).

The structure of the intermediate has been further confirmed by IR spectroscopic analysis.

In a 1 liter reactor, equipped with stirrer, thermometer, feeding funnel, condenser and heating bath, there are introduced 450 cc of orthodichlorobenzene, 49.4 g of the intermediate (XX) and 30.5 g of 2-hydroxyethylamine.

The mass is heated to 140° C. and is maintained under agitation at this temperature for 24 hours.

At the end the whole is cooled to room temperature and the product formed is filtered.

The cake is well rinsed and washed abundantly with water.

After drying in oven at 100° C., 54.2 g of the product:

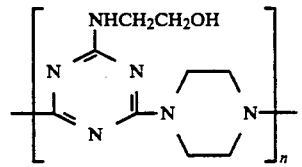

are obtained in form of white crystalline powder having melting point higher than 300° C. and n=15.

EXAMPLE 4

800 cc of xylene, 100 g of the intermediate (XVIII), 38.6 g of piperazine and 35.9 g of sodium hydroxide are introduced in a 2 liters reactor equipped as in example 1.

The mass is heated to boiling and is maintained under reflux for 24 hours.

At the end the mass is cooled to room temperature and the product formed is filtered and washed abundantly on the filter with water.

By drying the cake, 100.8 g of the product:

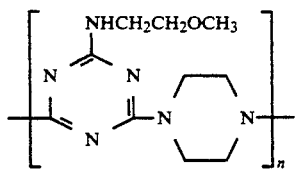

are obtained in form of white crystalline powder having m.p. higher than 300° C. and n=16.

EXAMPLE 5

In a 1 liter reactor equipped as in example 1 there are introduced 350 cc of xylene, 30 cc of water, 66.9 g of the intermediate (XVIII) and, under agitation within about 15 minutes, 30.9 g of diethyltriamine.

The temperature of the mass raises to 50° C.

By working subsequently according to the working modalities described in example 1 (in this case 24 g of sodium hydroxide are used), 72.8 g of the product:

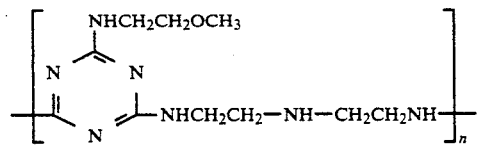

are obtained in from of white crystalline powder having m.p. higher than 300° C. with n=18.

EXAMPLE 6

In a 2 liters steel reactor 800 cc of water, 250 g of a 30% by weight ammonia solution and 200 g of the intermediate (XX) are introduced.

The mixture is then heated to 150° C. and is maintained at this temperature for 12 hours.

After cooling to room temperature, the product formed is filtered and washed on the filter with water.

By drying the cake in oven at 100° C., 174.2 g of the product:

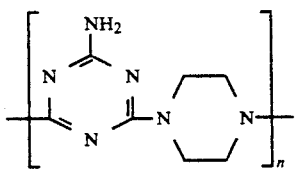

are obtained in form of white crystalline powder having m.p. higher than 300° C. and n=15.

EXAMPLES 7–14

By working under conditions analogous to those described in examples from 1 to 6 products of general formula (I) reported in Table 2 are prepared.

TABLE 2

| Ex. No. | R—N—R$_1$ | | —Z— | m.p. (°C.) | η |
|---|---|---|---|---|---|
| 7 | CH$_2$CH$_2$OH | CH$_3$ | —N(piperazine)N— | >300 | 20 |
| 8 | CH$_2$CH$_2$OCH$_3$ | H | —HN—C$_6$H$_4$—NH— | >300 | 18 |
| 9 | CH$_2$CH$_2$CH$_2$OCH$_3$ | H | —N(piperazine)N— | 210–215 | 22 |
| 10 | CH$_2$CH$_2$OH | H | —HNC(CH$_3$)$_2$—C$_6$H$_4$—C(CH$_3$)$_2$NH— | 230–235 | 14 |
| 11 | CH$_2$CH$_2$OH | CH$_2$CH$_2$OH | —N(piperazine)N— | >300 | 14 |
| 12 | CH$_2$CH$_2$OCH$_3$ | H | —HN(CH$_2$)$_2$—N—(CH$_2$)$_2$NH— | >300 | 18 |

TABLE 2-continued

| Ex. No. | R—N—R₁ | | —Z— | m.p. (°C.) | η |
|---|---|---|---|---|---|
| 13 | CH₂CH₂OH | CH₃ | —HN(CH₂)₃N⟨  ⟩N—(CH₂)₃NH— | 197-201 | 19 |
| 14 | CH₂CH₂OH | H | —HN—(CH₂)₆—NH— | >300 | 21 |

Tables 3 and 4

Tests reported in the above specified tables relate to polymeric compositions containing products of general formula (I) prepared according to the preceding examples.

Specimens have been prepared in form of little plates having thickness about 3 mm by molding mixtures of granular polymer and additives in a MOORE plate press, by working for 7 minutes at a pressure of 40 kg/cm².

On the thus obtained plates the self-extinguishing level has been determined by measuring the oxygen index (L.O.I. according to the ASTM D-2863/77) in Stanton Redcroft apparatus and applying the "Vertical Burning Test", which allows to classify the material at three levels 94 V-0, 94 V-1 and 94 V-2 according to rules UL 94 (edited by "Underwriters Laboratories" USA).

In Table 3 values obtained using a isotactic polypropylene in flakes having a Melt Flow Index equal to 12 and a n-heptane insoluble fraction equal to 96% by weight are reported.

In Table 4 values are reported obtained when using a low density polyethylene in granules having Melt Flow Index equal to 7; a granulated polystyrene containing 5% by weight of butadiene rubber and having Melt Flow Index equal to 9; a thermoplastic polyurethane either polyester (ESTANE 54600 ® by Goodrich) or polyether (ESTANE 58300 ® by Goodrich) in granules having specific gravity equal to 1.19 and 1.10 g/cm³ respectively; an ethylene-propylene elastomeric copolymer having a percent by weight of propylene equal to 45; an acrylonitrile-butadiene-styrene terpolymer having specific gravity equal to 1.06 g/cm³, Melt Flow Index equal to 1.6 and containing about 40% of acrylonitrile and styrene and 20% of butadiene.

TABLE 3

| Example No. | Product N | Parts by Weight | | | | L.O.I. (ASTM D2863) | UL 94 3 mm |
|---|---|---|---|---|---|---|---|
| | | Product | PP[1] | AO[2] | APP[1] | | |
| 15 | 1 | 6.0 | 75 | 1 | 18.0 | 32.5 | VO |
| 16 | 2 | 5.3 | 75 | 1 | 18.7 | 33.4 | VO |
| 17 | 2 | 8.5 | 65 | 1 | 25.5 | 43.0 | VO |
| 18 | 3 | 5.0 | 74 | 1 | 20.0 | 32.8 | VO |
| 19 | 4 | 4.0 | 77 | 1 | 18.0 | 33.2 | VO |
| 20 | 4 | 12.0 | 75 | 1 | 12.0 | 30.9 | VO |
| 21 | 5 | 6.0 | 75 | 1 | 18.0 | 32.8 | VO |
| 22 | 6 | 6.0 | 75 | 1 | 18.0 | 33.7 | VO |
| 23 | 7 | 6.0 | 75 | 1 | 18.0 | 36.0 | VO |
| 24 | 8 | 6.5 | 73 | 1 | 19.5 | 32.9 | VO |
| 25 | 9 | 9.6 | 75 | 1 | 14.4 | 34.6 | VO |
| 26 | 10 | 6.7 | 72 | 1 | 20.3 | 33.9 | VO |
| 27 | 11 | 6.0 | 75 | 1 | 18.0 | 35.7 | VO |
| 28 | 12 | 6.0 | 75 | 1 | 18.0 | 32.4 | VO |
| 29 | 13 | 6.0 | 75 | 1 | 18.0 | 32.6 | VO |
| 30 | 14 | 5.8 | 73 | 1 | 20.2 | 36.1 | VO |
| 31 | 4 | 6.0 | 75 | 1 | 18.0* | 33.5 | VO |
| 32 | 9 | 8.5 | 65 | 1 | 25.5* | 43.0 | VO |
| 33 | 1 | 6.0 | 75 | 1 | 18.0[3] | 31.7 | VO |
| 34 | 6 | 5.0 | 74 | 1 | 20.0[4] | 30.9 | VO |
| 35 | 2 | 6.0 | 75 | 1 | 18.0[5] | 31.3 | VO |
| 36 | 4 | 5.2 | 73 | 1 | 20.8[3] | 32.2 | VO |

[1]PP = polypropylene
APP = ammonium polyphosphate- Exolit 422 ® (Hoechst)
*APP = microincapsulated with melamine-formaldehyde resin Exolit 422 ® (Hoechst)
[2]AO = antioxidizing agent
Mixture consisting of 2 parts of dilaurylthiopropionate and 1 part of tetra|3-(3,5-diterbutyl-4-hydroxyphenyl)propionate of pentaerythritol.
[3]monoammonium salt from 1-aminoethane-1,1-diphosphonic acid
[4]bisammonium salt from 1-aminoethane-1,1-diphosphonic acid
[5]mnoammonium salt from 1-hydroxyethane-1,1-diphosphonic acid.

TABLE 4

| Ex. N. | Supp. Polymer[2] | Product example N. | Parts by Weight | | | | L.O.I. (ASTM-D2863) | UL 94 3 mm |
|---|---|---|---|---|---|---|---|---|
| | | | Product | Polymer | AO[3] | APP[1] | | |
| 37 | LDPE | 2 | 7.8 | 68 | 1 | 23.2 | 32.4 | VO |
| 38 | | 3 | 7.6 | 65 | 1 | 26.4 | 36.2 | VO |
| 39 | | 4 | 7.5 | 70 | 1 | 21.5 | 37.8 | VO |
| 40 | | 4 | 7.8 | 60 | 1 | 31.2 | 45.2 | VO |
| 41 | | 9 | 7.5 | 69 | 1 | 22.5 | 35.9 | VO |
| 42 | HIPS | 1 | 20.0 | 60 | 1 | 19.0 | 34.6 | VO |
| 43 | | 4 | 8.7 | 60 | 1 | 30.3 | 33.0 | VO |
| 44 | | 9 | 9.8 | 60 | 1 | 29.2 | 35.5 | VO |
| 45 | | 12 | 10.5 | 62 | 1 | 26.5 | 32.5 | VO |
| 46 | PU (estere) | 4 | 5.8 | 70 | 1 | 23.2 | 35.0 | VO |
| 47 | | 9 | 5.8 | 70 | 1 | 23.2 | 35.0 | VO |
| 48 | PU etere | 1 | 6.4 | 70 | 1 | 22.6 | 33.2 | VO |
| 49 | PP/PE | 4 | 5.8 | 70 | 1 | 23.2 | 33.5 | VO |
| 50 | | 11 | 7.3 | 70 | 1 | 21.7 | 34.1 | VO |

TABLE 4-continued

| Ex. N. | Supp. Polymer[2] | Product example N. | Parts by Weight | | | | L.O.I. (ASTM-D2863) | UL 94 3 mm |
|---|---|---|---|---|---|---|---|---|
| | | | Product | Polymer | AO[3] | APP[1] | | |
| 51 | ABS | 9 | 8.5 | 65 | 1 | 25.5 | 33.2 | VO |

[1]APP = Ammonium polyphosphate- Exolit 422 ® (Hoechst)
[2]LDPE = low density polyethylene
HIPS = polystyrene containing 5% of butadiene rubber
PU (ester) = polyurethane polyester
PU (ether) = polyurethane polyether
PP/PE = propylene-ethylene copolymer
ABS = acrylonitrile-butadiene-styrene terpolymer
[3]AO = antioxidizing agent
Mixture consisting of 2 parts of dilaurylthiopropionate and 1 part of tetra|3-(3,5-di-terbutyl-4-hydroxyphenyl)propionate| of pentaerythritol.

EXAMPLE 52

Comparison example

By working according to the modalities used in examples from 15 to 36, but using as nitrogenous compound the product of general formula (I) wherein R and $R_1$ are ethyl, Z is piperazine and n is 20, the composition hereinafter specified is prepared:

| | |
|---|---|
| Polypropylene | 75 parts by weight |
| Antioxidizing agent | 1 part by weight |
| Nitrogenous compound | 6 parts by weight |
| Ammonium polyphosphate | 18 parts by weight |

Using the above specified composition specimens have been prepared which have been subjected to self-extinguishing tests according to the previously described modalities.

The following results have been obtained:

| | |
|---|---|
| L.O.I. | = 29.8 |
| UL 94 (3 mm): | class B (the specimen burns). |

We claim:
1. Self-extinguishing polymeric compositions comprising:
   a) from 89 to 40 parts by weight of a thermoplastic polymer or of a polymer having elastomeric properties;
   b) from 8 to 33 parts by weight of one or more phosphates and/or phosphonates of ammonium or of an amine; and
   c) 3 to 27 parts by weight of one or more oligomeric compounds derived from 2,4,6-triamino-1,3,5-triazine, having the general formula (I):

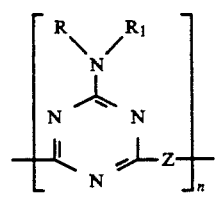

wherein
R is $+C_mH_{2m}+OR_2$, wherein m is an integer comprised between 2 and 8,
$R_2$ is H; $C_1$-$C_8$-alkyl $C_2$-$C_8$-alkenyl; $+C_pH_{2p}+OR_3$ wherein p is an integer comprised between 1 and 4
and $R_3$ is H, $C_1$-$C_4$-alkyl, $C_6$-$C_{12}$-cycloalkyl or $C_6$-$C_{12}$-alkylcycloalkyl;
$R_1$ is H; $C_1$-$C_4$-alkyl or R;
n is an integer comprised between 2 and 50;
Z is a divalent or polyvalent radical comprised of one of the following formulae:

wherein radicals $R_4$, equal or different among them, are hydrogen or $C_1$-$C_4$-alkyl;

wherein q is an integer comprised between 2 and 14; $R_5$ is hydrogen; $C_1$-$C_4$-alkyl; $C_2$-$C_6$-alkenyl; $C_1$-$C_4$-hydroxyalkyl;

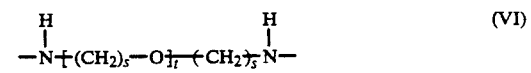

wherein s is an integer comprised between 2 and 5 and t is an integer comprised between 1 and 3;

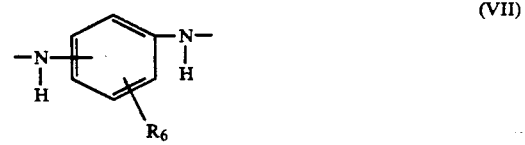

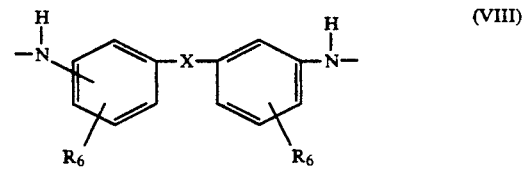

wherein:
X is a direct bond C—C; O; S; S—S; SO; SO₂; NH; NHSO₂; NHCO; N=N; CH₂;
R₆ is hydrogen; hydroxyl; C₁-C₄-alkyl; (C₁-C₄)-alkoxy;

  (IX)

wherein A is a saturated or an unsaturated cycle;

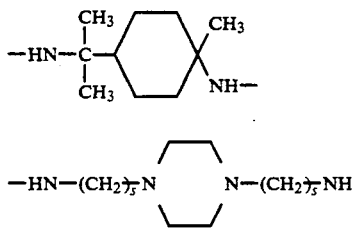  (X)

(XI)

wherein s has the previously defined meaning;

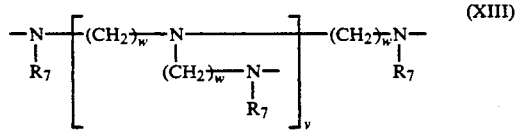  (XII)

where:
R₇ is hydrogen or C₁-C₄-alkyl;
r is an integer comprised between 1 and 5; indexes s, equal or different among them, have the previously defined meaning;

  (XIII)

wherein:
R₇ has the previously defined meaning;
w is an integer comprised between 2 and 4;
v is 1 or 2.

2. Self-extinguishing polymeric compositions according to claim 1, wherein radical R, in the formula (I) is —C$_m$H$_{2m}$—OR₂ wherein m is an integer comprised between 2 and 4 and R₂ is hydrogen or (C₁-C₄)-alkyl.

3. Self-extinguishing polymeric compositions according to claim 1 or 2, wherein radical R₁ is hydrogen.

4. Self-extinguishing polymeric compositions according to claim 1 or 2, wherein the ammonium phosphate or phosphates (b) have the formula (NH₄)$_{n+2}$P$_n$O$_{3n+1}$ wherein n is an integer equal to or higher than 2.

5. Self-extinguishing polymeric compositions according to claim 1 or 2, wherein the ammonium phosphate or phosphates (b) have the formula (NH₄PO₃)$_n$ wherein n is an integer comprised between 50 and 500.

6. Self-extinguishing polymeric compositions according to claim 1 or 2, wherein the phosphate or phosphates of amine (b) are selected from dimethylammonium, diethylammonium phosphate, ethylenediamine phosphate, or ortho- or pyrophosphate of melamine.

7. Self-extinguishing polymeric compositions according to claim 1 or 2, wherein the phosphate or phosphates of ammonium (b) are of mono- and polyphosphonic acids.

8. Self-extinguishing polymeric compositions according to claim 1 or 2, wherein the polymer (a) is selected from olefinic polymers and copolymers of the general formula R—CH=CH₂ wherein R is a hydrogen atom, (C₁-C₈)-alkyl or aryl radical; acrylonitrile/butadiene/styrene copolymers (ABS); styrene/acrylonitrile copolymers (SAN); polyurethane; polyethylenterephthalate; polybutylenterephthalate; or polyamides.

9. Self-extinguishing polymeric compositions according to claim 8, wherein olefinic polymers and copolymers are selected from:
1. HDPE, LLDPE and LDPE polyethylene;
2. isotactic or prevailingly isotactic polypropylene;
3. crystalline copolymers of propylene with lower proportions of ethylene and/or of other alpha-olefins, such as butene-1; hexene-1; octene-1; 4-methyl-pentene-1;
heterophasic compositions comprising (A) a homopolymeric fraction of ethylene or of propylene or of one of copolymers specified under (3) and (B) a copolymeric fraction consisting of elastomeric copolymers of ethylene with an alpha-olefin, containing optionally lower proportions of a diene;
elastomeric copolymers of ethylene with alpha-olefins containing optionally lower proportions of a diene.

10. Self-extinguishing polymeric composition according to claim 1 or 2, wherein said one or more oligomeric compounds derived from 2,4,6-triamino-1,3,5-triazine (c) having the formula (I) is present in from 4 to 20 parts by weight.

11. Self-extinguishing polymeric composition according to claim 1 or 2, wherein in said one or more oligomeric compounds derived from 2,4,6-triamino-1,3,5-triazine (c) having the formula (I), m is an integer comprised between 2 and 4.

12. Self-extinguishing polymeric composition according to claim 1 or 2, wherein in said one or more oligomeric compounds derived from 2,4,6-triamino-1,3,5-triazine (c) having the formula (I), R₂ is H or C₁-C₄-alkyl.

13. Self-extinguishing polymeric composition according to claim 1 or 2, wherein in said one or more oligomeric compounds of the formula (I), Z is of the formula (II).

14. Self-extinguishing polymeric composition according to claim 1 or 2, wherein in said one or more oligomeric compounds of the formula (I), Z is of the formula (III).

15. Self-extinguishing polymeric composition according to claim 1 or 2, wherein in said one or more oligomeric compounds of the formula (I), Z is of the formula (IV).

16. Self-extinguishing polymeric composition according to claim 1 or 2, wherein in said one or more oligomeric compounds of the formula (I), Z is of the formula (V).

17. Self-extinguishing polymeric composition according to claim 1 or 2, wherein in said one or more oligomeric compounds of the formula (I), Z is of the formula (VI).

18. Self-extinguishing polymeric composition according to claim 1 or 2, wherein in said one or more oligomeric compounds of the formula (I), Z is of the formula (VII).

19. Self-extinguishing polymeric composition according to claim 1 or 2, wherein in said one or more oligomeric compounds of the formula (I), Z is of the formula (VIII).

20. Self-extinguishing polymeric composition according to claim 1 or 2, wherein in said one or more oligomeric compounds of the formula (I), Z is of the formula (IX).

21. Self-extinguishing polymeric composition according to claim 1 or 2, wherein in said one or more oligomeric compounds of the formula (I), Z is of the formula (X).

22. Self-extinguishing polymeric composition according to claim 1 or 2, wherein in said one or more oligomeric compounds of the formula (I), Z is of the formula (XI).

23. Self-extinguishing polymeric composition according to claim 1 or 2, wherein in said one or more oligomeric compounds of the formula (I), Z is of the formula (XII).

24. Self-extinguishing polymeric composition according to claim 1 or 2, wherein in said one or more oligomeric compounds of the formula (I), Z is of the formula (XIII).

25. Molded manufactured articles, obtained from the compositions of claim 1 or 2.

26. Self-extinguishing polymeric compositions comprising:
a) from 89 to 40 parts by weight of a thermoplastic polymer or of a polymer having elastomeric properties;
b) from 8 to 33 parts by weight of one or more phosphates and/or phosphonates of ammonium or of an amine; and
c) 3 to 27 parts by weight of one or more oligomeric compounds derived from 2,4,6-triamino-1,3,5-triazine, having the general formula (I):

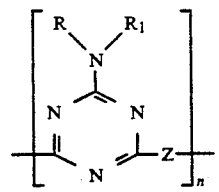   (I)

wherein
R and $R_1$ each are hydrogen;
n is an integer comprised between 2 and 50;
Z is a divalent or polyvalent radical comprised of one of the following formulae;

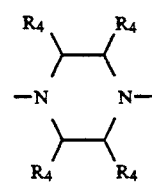   (II)

wherein radicals $R_4$, equal or different among them, are hydrogen or $C_1$-$C_4$-alkyl;

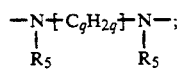   (III)

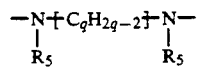   (IV)

wherein q is an integer comprised between 2 and 14; $R_5$ is hydrogen; $C_1$-$C_4$; $C_1C_4$-hydroalkyl;

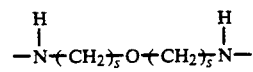   (V)

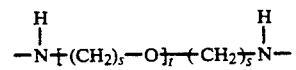   (VI)

wherein s is an integer comprised between 2 and 5 and t is an integer comprised between 1 and 3;

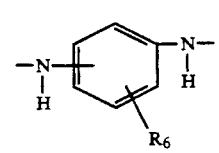   (VII)

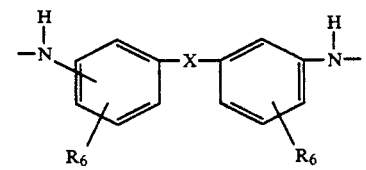   (VIII)

wherein:
x is a direct bond C—C; O; S; S—S; SO; $SO_2$; NH; $NHSO_2$; NHCO; N=N; $CH_2$;
$R_6$ is hydrogen; hydroxyl; ($C_1$-$C_4$-alkyl); $C_1$-$C_4$)-alkoxy;

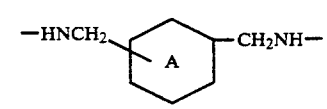   (IX)

wherein A is a saturated or an unsaturated cycle;

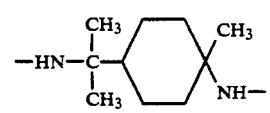   (X)

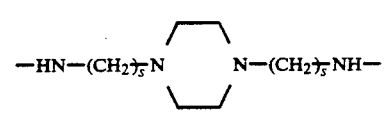   (XI)

wherein s has the previously defined meaning;

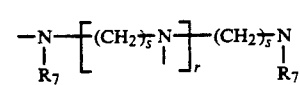   (XII)

where:

$R_7$ is hydrogen or $C_1$–$C_4$-alkyl;

r is an integer comprised between 1 and 5; indexes s, equal or different among them, have the previously defined meaning;

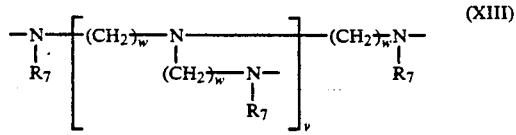

wherein:

$R_7$ has the previously defined meaning;

w is an integer comprised between 2 and 4;

v is 1 or 2.

27. Self-extinguishing polymeric compositions according to claim 26, wherein the ammonium phosphate or phosphates (b) have the formula $(NH_4)_{n+2}P_nO_{3n+1}$ wherein n is an integer equal to or higher than 2.

28. Self-extinguishing polymeric compositions according to claim 26, wherein the ammonium phospate or phosphates (b) have the formula $(NH_4PO_3)_n$ wherein n is an integer comprised between 50 and 500.

29. Self-extinguishing polymeric compositions according to claim 26, wherein the phosphate or phosphates of amine (b) are selected from dimethylammonium, diethylammonium phosphate, ethylenediamine phosphate, or ortho- or pyrophosphate of melamine.

30. Self-extinguishing polymeric compositions according to claim 26, wherein the phosphate or phosphates of ammonium (b) are of mono and polyphosphonic acids.

31. Self-extinguishing polymeric compositions according to claim 26, wherein the polymer (a) is selected from olefinic polymers and copolymers of the general formula R—CH=$CH_2$ wherein R is a hydrogen atom, $(C_1$–$C_8)$-alkyl or aryl radical; acrylonitrile/butadiene/styrene copolymers (ABS); styrene/acrylonitrile copolymers (SAN); polyurethane; polyethylenterephthalate; polybutylenterephthalate; or polyamides.

32. Self-extinguishing polymeric compositions according to claim 31, wherein olefinic polymers and copolymers are selected from:
1. HDPE, LLDPE and LDPE polyethylene;
2. isotactic or prevailingly isotactic polypropylene;
3. crystalline copolymers of propylene with lower proportions of ethylene and/or of other alpha-olefins, such as butene-1; hexene-1; octene-1; 4-methyl-pentene-1;
4. heterophasic compositions comprising (A) a homopolymeric fraction of ethylene or of propylene or of one of copolymers specified under (3) and (B) a copolymeric fraction consisting of elastomeric copolymers of ethylene with an alpha-olefin, containing optionally lower proportions of a diene;
5. elastomeric copolymers of ethylene with alpha-olefins containing optionally lower proportions of a diene.

33. The self-extinguishing polymeric composition of claim 26, wherein said one or more oligomeric compounds derived from 2,4,6-triamino-1,3,5-triazine (c) having the formula (I) is present in from 4 to 20 parts by weight.

34. The self-extinguishing polymeric composition according to claim 26, wherein in said one or more oligomeric compounds of the formula (I), Z is of the formula (II).

35. The self-extinguishing polymeric composition according to claim 26, wherein in said one or more oligomeric compounds of the formula (I), Z is of the formula (III).

36. The self-extinguishing polymeric composition according to claim 26, wherein in said one or more oligomeric compounds of the formula (I), Z is of the formula (IV).

37. The self-extinguishing polymeric composition according to claim 26, wherein in said one or more oligomeric compounds of the formula (I), Z is of the formula (V).

38. The self-extinguishing polymeric composition according to claim 26, wherein in said one or more oligomeric compounds of the formula (I), Z is of the formula (VI).

39. The self-extinguishing polymeric composition according to claim 26, wherein in said one or more oligomeric compounds of the formula (I), Z is of the formula (VII).

40. The self-extinguishing polymeric composition according to claim 26, wherein in said one or more oligomeric compounds of the formula (I), Z is of the formula (VIII).

41. The self-extinguishing polymeric composition according to claim 26, wherein in said one or more oligomeric compounds of the formula (I), Z is of the formula (IX).

42. The self-extinguishing polymeric composition according to claim 26, wherein in said one or more oligomeric compounds of the formula (I), Z is of the formula (X).

43. The self-extinguishing polymeric composition according to claim 26, wherein in said one or more oligomeric compounds of the formula (I), Z is of the formula (XI).

44. The self-extinguishing polymeric composition according to claim 26, wherein in said one or more oligomeric compounds of the formula (I), Z is of the formula (XII).

45. The self-extinguishing polymeric composition according to claim 26, wherein in said one or more oligomeric compounds of the formula (I), Z is of the formula (XIII).

* * * * *